(12) United States Patent
Michalczyk et al.

(10) Patent No.: US 8,071,198 B2
(45) Date of Patent: Dec. 6, 2011

(54) GLASS ARTICLES WITH ADHESION AND STAIN RESISTANT NON-STICK COATINGS

(75) Inventors: Michael Joseph Michalczyk, Wilmington, DE (US); Michael J. Witsch, Norwood, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 720 days.

(21) Appl. No.: 11/927,867

(22) Filed: Oct. 30, 2007

(65) Prior Publication Data

US 2008/0118741 A1    May 22, 2008

Related U.S. Application Data

(60) Provisional application No. 60/859,731, filed on Nov. 17, 2006.

(51) Int. Cl.
- *B32B 17/10* (2006.01)
- *B32B 27/06* (2006.01)
- *B32B 27/20* (2006.01)
- *B32B 27/34* (2006.01)

(52) U.S. Cl. ........ 428/142; 428/325; 428/331; 428/336; 428/421; 428/428; 428/447; 428/473.5

(58) Field of Classification Search ................ None
See application file for complete search history.

(56) References Cited

U.S. PATENT DOCUMENTS

| | | | |
|---|---|---|---|
| 3,558,345 A | 1/1971 | Baum et al. | |
| 3,655,604 A | 4/1972 | Strolle | |
| 4,014,834 A | 3/1977 | Concannon | |
| 4,049,863 A | 9/1977 | Vassiliou | |
| 4,353,950 A * | 10/1982 | Vassiliou | 428/195.1 |
| 4,526,603 A * | 7/1985 | Lehman et al. | 65/134.3 |
| 4,961,996 A | 10/1990 | Carre et al. | |
| 5,037,701 A | 8/1991 | Carre et al. | |
| 5,071,695 A | 12/1991 | Tannenbaum | |
| 5,079,073 A | 1/1992 | Tannenbaum | |
| 5,468,798 A * | 11/1995 | Leech | 524/440 |
| 5,478,651 A | 12/1995 | Tannenbaum | |
| 6,114,028 A | 9/2000 | Muchin et al. | |
| 6,242,089 B1 * | 6/2001 | Buegman | 428/339 |
| 6,248,435 B1 | 6/2001 | Leck | |
| 6,291,054 B1 | 9/2001 | Thomas et al. | |
| 6,592,977 B2 | 7/2003 | Thomas et al. | |
| 6,781,964 B1 | 7/2004 | Tannenbaum | |
| 6,863,974 B2 | 3/2005 | Shah et al. | |
| 2002/0002229 A1 | 1/2002 | Thomas et al. | |
| 2003/0021988 A1 | 1/2003 | Tannenbaum | |

FOREIGN PATENT DOCUMENTS

| | | |
|---|---|---|
| EP | 1 197 268 A2 | 4/2002 |
| WO | WO 2006/066027 A1 | 6/2006 |
| WO | WO 2007/114941 A2 | 10/2007 |

OTHER PUBLICATIONS

CRC Handbook of Chemistry and Physics, 77th Edition, 1996-1997, pp. 12-166 and 187.
PCT International Search Report and Written Opinion for International Application No. PCT/US2007/024070 dated Jun. 5, 2008.

* cited by examiner

*Primary Examiner* — Ramsey Zacharia

(57) ABSTRACT

The invention provides a non-stick coating for glass cookware that has good adhesion and stain resistance while maintaining the abrasion resistance of the non-stick coating. The non-stick coating comprises a base coat that contains fluoropolymer and colloidal silica and an overcoat comprising one or more polymer layers containing inorganic filler film hardener.

24 Claims, No Drawings

GLASS ARTICLES WITH ADHESION AND STAIN RESISTANT NON-STICK COATINGS

FIELD OF THE INVENTION

The present invention relates to a non-stick coating adhered to glass. More particularly, the present invention relates to a stain resistant non-stick coating adhered to a glass substrate.

BACKGROUND OF THE INVENTION

Fluoropolymer resins are known for their low surface energy and non-stick properties as well as thermal and chemical resistance. Known non-stick coatings, such as described in U.S. Pat. No. 6,592,977 B2, provide abrasion resistance using a three-coat layer system. For decorative cookware, particularly glass, it is becoming increasingly desirable to have good adherence and durability over time for decorative articles such as cookware. That is, it needs to be resistant to poor adhesion over time due to wear and repetitive cleaning. And additionally, it is important that decorative cookware be aesthetically pleasing as a serving dish. That is, in going from the stove/oven to the table for serving, the decorative cookware needs to be resistant to staining, in addition to being abrasion resistance, such that the cookware easily adapts from a cooking apparatus to a serving dish.

U.S. Pat. No. 3,655,604 to Strolle discloses a composition for priming a surface to improve adhesion of a fluorocarbon polymer topcoat in a two-coat system.

It is desirable to have a non-stick coating that has both good adhesion to glass and good stain resistance while maintaining good abrasion resistance characteristics.

SUMMARY OF THE INVENTION

Briefly stated, and in accordance with one aspect of the present invention, there is provided a coated article comprising: a glass substrate having a surface, and b) a stain resistant, non-stick coating adhered to the surface of said substrate, wherein said non-stick coating comprises: i) a base coat comprising fluoropolymer and colloidal silica, and ii) an overcoat comprising one or more polymer layers containing ceramic particles.

DETAILED DESCRIPTION OF THE INVENTION

The present invention achieves good adhesion and stain resistance for non-stick coated cookware or other articles while maintaining abrasion resistance by using a layered coating system on the cookware or other articles. The term "cookware" means all articles used in cooking and heating including but not limited to bake ware, top-of-range cookware, microwavable dishes and those cooking articles which have multiple uses such as storage and particularly serving in addition to cooking. These characteristics (e.g. abrasion resistance, stain resistance, non-stick coating adhesion, and durability) are beneficial, for example, to enable decorative cookware to go from the oven/stove to the table as a serving dish because the aesthetics of the cookware are not damaged/compromised (e.g. scratches, poor adhesion and/or staining) by repeated use of the cookware for cooking or cleaning. These characteristics are also beneficial in going from cooking or serving to storage in cold temperatures such as the freezer or refrigerator. An embodiment of the present invention provides a coated article comprising: a glass substrate having a surface, and b) a stain resistant, non-stick coating adhered to the surface of said substrate, wherein said non-stick coating comprises: i) a base coat comprising fluoropolymer and colloidal silica, and ii) an overcoat comprising one or more polymer layers containing inorganic filler film hardener, preferably ceramic particles.

A preferred embodiment of the present invention is a four-coat system applied to the article. The present invention's durability, adhesion and stain resistance is shown by the test method results and comparative examples contained herein. The four-coat system comprises four layers in sequential order that include: 1) a base coat, 2) a primer layer, 3) a midcoat or intermediate layer and 4) a topcoat.

The compositional layers of the four-coat system, with the exception of the base coat, are applied to the surface of the article by any of a number of known conventional methods that include spraying and dipping. The article or substrate being coated determines the most convenient/appropriate coating method to apply. The non-stick coating compositions are a multi-coat system comprising a base coat and an overcoat. The overcoat of one or more fluoropolymer-containing layers can be applied by conventional methods to the base coat layer prior to its drying. The base coat is lightly sprayed on a roughened glass substrate. The base coat can be applied to the substrate to a dry film thickness of up to 8.0 microns, preferably 0.1 to 8.0 microns, more preferably 0.1 to 5 microns, even more preferably 0.25-2.5 microns, and most preferably 1.25 microns.

When the primer layer or intermediate layer and overcoat layer compositions are aqueous dispersions, the overcoat composition can be applied to the primer layer or intermediate layer preferably after drying to touch. When the primer layer or intermediate layer is made by applying the composition from an organic solvent, and the next layer (intermediate coat or topcoat) is applied from an aqueous medium, the primer layer or intermediate layer should be dried so that all water-incompatible solvent is removed before application of such next layer.

A resultant composite structure can be baked to fuse all the coatings at the same time to form a non-stick coating on the substrate. When the fluoropolymer is PTFE, a quick high bake temperature is preferred, e.g., for 5 min. at a temperature starting at 800° F. (427° C.) and rising to 825° F. (440° C.). When the fluoropolymer in the primer or the overcoat is a blend of PTFE and FEP, e.g., 50-70 wt % PTFE and 50-30 wt % FEP, the bake temperature may be reduced to 780° F. (415° C.), rising to 800° F. (427° C.) in 3 minutes (total bake time). The baked primer layer or intermediate layer thickness is measured with film thickness instruments based on the eddy-current principle (ASTM B244) or magnetic induction principle (ASTM B499) and will generally be between 5-20 micrometers. The overcoat layer thickness will generally be from 10-25 micrometers (for both the intermediate coat layer and the topcoat layer).

In the resultant composite structure, the substrate is preferably transparent glass and more preferably borosilicate. Borosilicate glass typically contains silica (70-80 wt %) and boric oxide (7-13 wt %). The transparent glass may be clear or tinted. The glass substrate is preferably roughened. Borosilicate glass is a brittle substance and roughening the surface of the glass using a grit blasting method has the potential to weaken the glass substrate. Therefore, the surface is preferably roughened by light grit blasting. Preferably, the grit blasted surface has an average roughness of greater than 2 micrometers, and more preferably 2-4 micrometers, as measured by a Pocketsurf 1 surface tester made by Fred V. Fowler Co. Inc., Newton, Mass. Then, the glass surface is thoroughly cleaned. An embodiment of the base coat composition is shown in Table 1.

In one embodiment of the present invention, the primer layer of the present invention contains silicon carbide (SiC) and polyamideimide (PAI) to provide a barrier to achieve stain resistance of the coated article. Embodiments of the primer layer composition are shown in Tables 2, 5 and 6.

In an embodiment of the present invention, the primer layer and/or one or more intermediate layer(s) may contain ceramic particles. It is preferable that the ceramic particles are silicon carbide. In an embodiment of the present invention at least one polymer layer of the coated article of the present invention contains fluoropolymer. This polymer layer containing fluoropolymer is in addition to the fluoropolymer contained in the base coat.

Another embodiment of the present invention is that one or more layers of the primer and/or the intermediate layer of the coated article contain fluoropolymer and/or ceramic particles. For example, the primer may contain fluoropolymer and the intermediate layer may contain ceramic materials or vice versa. Or, a primer may contain both ceramic particles and fluoropolymer or, one or more of the intermediate layers may contain both.

Base Coat:

The base coat is the coating applied to the glass surface. The base coat promotes adhesion of the stain resistant non-stick coating to the glass surface such that it passes the Dishwasher Adhesion Test described herein.

The base coat comprises fluoropolymer and colloidal silica and optionally further comprises silicon resin. The fluoropolymer used in the base coat is the same as that described for the overcoat herein.

The fluoropolymers used in this base coat include those mentioned below for the overcoat. The fluoropolymer is in the composition in a concentration of from about 20% through about 90%, by weight of the total solids. A concentration of 30-80 is preferred; 40-50 wet wt % or 63-68 dry wt % is even more preferred.

The colloidal silica used in the composition is generally in the form of an aqueous sol of silica particles. The silica particles are discrete uniform spheres of silica which have no internal surface area or detectable crystallinity. Some surface silica atoms may be replaced by aluminum atoms. The particles have a size of 5-100 millimicrons, preferably 7-25 millimicrons, as measured optically against a standard. The aqueous sol of silica has a specific surface area of 125-420 square meters per gram and a pH of 8.4-9.9 at 25 C. Stabilizing additives can also be present in the aqueous sol. Examples of stabilizing additives are sodium hydroxide, ammonium hydroxide, and sodium aluminate. Typical of such colloidal silcas are those sold by E.I. duPont de Nemours and Company as "Ludox HS-40", "Ludox-HS", "Ludox-LS", "Ludox SM-30", "Ludox TM", "Ludox-AS", and "Ludox-AM". Mixtures of silicas can be used.

The colloidal silica is present in the composition at a concentration of from about 10% through 80%, preferably 10-50%, more preferably 20-35%, by weight of the total solids.

Optionally, the base coat can contain silicone resin. The silicone resin comprises alkylphenyl polysiloxane resin having a 0-3 weight percent (dry or wet) in the base coat.

Overcoat:

The overcoat layer comprises one or more polymer layers applied to the base coat. The overcoat may include a primer layer and/or one or more intermediate layers (e.g. intermediate layer(s)) and a topcoat layer. A preferred polymer for use in this overcoat is fluoropolymer.

The fluoropolymer used in the present invention is preferably polytetrafluoroethylene (PTFE) having a melt viscosity of at least $1 \times 10^8$ Pa·s at 380° C. for simplicity in formulating the composition and the fact that PTFE has the highest heat stability among the fluoropolymers. Such PTFE can also contain a small amount of comonomer modifier which improves film-forming capability during baking (fusing), such as perfluoroolefin, notably hexafluoropropylene (HFP) or perfluoro(alkyl vinyl) ether, notably wherein the alkyl group contains 1 to 5 carbon atoms, with perfluoro(propyl vinyl ether) (PPVE) being preferred. The amount of such modifier will be insufficient to confer melt-fabricability to the PTFE, generally being no more than 0.5 mole %. The PTFE, also for simplicity, can have a single melt viscosity, usually at least $1 \times 10^9$ Pa·s, but a mixture of PTFEs having different melt viscosities can be used to form the fluoropolymer component. Use of a single fluoropolymer in the composition, which is the preferred condition, means that the fluoropolymer has a single chemical identity and melt viscosity.

While PTFE is preferred, the fluoropolymer component can also be melt-fabricable fluoropolymer, either combined (blended) with the PTFE, or in place thereof. Examples of such melt-fabricable fluoropolymers include copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3-6 carbon atoms and perfluoro(alkyl vinyl ethers) (PAVE) wherein the alkyl group contains 1-5 carbon atoms, especially 1-3 carbon atoms. Especially preferred comonomers include hexafluoropropylene (HFP), perfluoro(ethyl vinyl ether) (PEVE), perfluoro(propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The molecular weight of the melt-fabricable tetrafluoroethylene copolymers is unimportant except that it be sufficient to be film-forming and be able to sustain a molded shape so as to have integrity in the primer application. Typically, the melt viscosity will be at least $1 \times 10^2$ Pa·s and may range up to about $60-100 \times 10^3$ Pa·s as determined at 372° C. according to ASTM D-1238.

The fluoropolymer component is generally commercially available as a dispersion of the polymer in water, which is the preferred form for the composition of the invention for ease of application and environmental acceptability. By "dispersion" is meant that the fluoropolymers particles are stably dispersed in the aqueous medium, so that settling of the particles does not occur within the time when the dispersion will be used; this is achieved by the small size of the fluoropolymer particles, typically on the order of 0.2 micrometers, and the use of surfactant in the aqueous dispersion by the dispersion manufacturer. Such dispersions can be obtained directly by the process known as dispersion polymerization, optionally followed by concentration and/or further addition of surfactant.

Alternatively, the fluoropolymer component may be a fluoropolymer powder such as PTFE micropowder. In which case, typically an organic liquid is used in order to achieve an intimate mixture of fluoropolymer and polymer binder. The organic liquid may be chosen because a binder dissolves in that particular liquid. If the binder is not dissolved within the liquid, then the binder can be finely divided and be dispersed with the fluoropolymer in the liquid. The resultant coating composition can comprise fluoropolymer dispersed in organic liquid and polymer binder, either dispersed in the liquid or dissolved in order to achieve the intimate mixture desired. The characteristics of the organic liquid will depend upon the identity of the polymer binder and whether a solution or dispersion thereof is desired. Examples of such liquids include N-methylpyrrolidone, butyrolactone, high boiling aromatic solvents, alcohols, mixtures thereof, among others. The amount of the organic liquid will depend on the flow characteristics desired for the particular coating operation.

Polymer Binder:

The overcoat, specifically the primer and/or the intermediate layer(s) preferably contain a heat resistant polymer binder. The binder component is composed of polymer which is film-forming upon heating to fusion and is also thermally stable. This component is well known in primer applications for non-stick finishes, for adhering the fluoropolymer-containing primer layer to substrates and for film-forming within and as part of a primer layer. The fluoropolymer by itself has little to no adhesion to a smooth substrate. The binder is generally non-fluorine containing and yet adheres to the fluoropolymer. Preferred binders are those that are soluble or solubilized in water or a mixture of water and organic solvent for the binder, which solvent is miscible with water. This solubility aids in the blending of the binder with the fluorocarbon component in the aqueous dispersion form.

An example of the binder component is polyamic acid salt which converts to polyamideimide (PAI) upon baking of the composition to form the primer layer. This binder is preferred because in the fully imidized form obtained by baking the polyamic acid salt, this binder has a continuous service temperature in excess of 250° C. The polyamic acid salt is generally available as polyamic acid having an inherent viscosity of at least 0.1 as measured as a 0.5 wt % solution in N,N-dimethylacetamide at 30° C. It is dissolved in a coalescing agent such as N-methylpyrrolidone, and a viscosity-reducing agent, such a furfuryl alcohol and reacted with tertiary amine, preferably triethylamine, to form the salt, which is soluble in water, as described in greater detail in U.S. Pat. No. 4,014,834 (Concannon). The resultant reaction medium containing the polyamic acid salt can then be blended with the fluoropolymer aqueous dispersion, and because the coalescing agent and viscosity-reducing agent are miscible in water, the blending produces a uniform coating composition. The blending can be achieved by simple mixing of the liquids together without using excess agitation so as to avoid coagulation of the fluoropolymer aqueous dispersion. Other binders that can be used include polyether sulfone (PES) and polyphenylene sulfide (PPS).

Whether the primer composition is applied as a liquid medium, wherein the liquid is water and/or organic solvent, the adhesion properties described above will manifest themselves upon drying and baking of the primer layer together with baking of the next-applied layer of fluoropolymer to form the non-stick coating of the substrate.

For simplicity, only one binder may be used to form the binder component of the composition of the present invention. However, multiple binders are also contemplated for use in this invention, especially when certain end-use properties are desired, such as flexibility, hardness, or corrosion protection. Common combinations include PAI/PES, PAI/PPS and PES/PPS.

The proportion of fluoropolymer and binder, especially if the composition is used as a primer layer on a smooth substrate, is preferably in the weight ratio of 0.5 to 2.0:1. The weight ratios of fluoropolymer to binder disclosed herein are based on the weight of these components in the applied layer formed by baking the composition after application to its substrate. The baking drives off the volatile materials present in the coating composition, including the salt moiety of the polyamic acid salt as the imide bonds are formed during baking. For convenience, the weight of binder, when it is polyamic acid salt which is converted to polyamideimide by the baking step, can be taken as the weight of polyamic acid in the starting composition, whereby the weight ratio of fluoropolymer to binder can be determined from the amount of fluoropolymer and binder in the starting composition. When the composition of the invention is in the preferred aqueous dispersion form, these components will constitute about 5 to 50 wt % of the total dispersion.

Inorganic Filler Film Hardener

The overcoat used in this invention, preferably the primer and/or the intermediate layer(s) contain inorganic filler film hardener. The inorganic filler film hardener component is one or more filler type materials which are inert with respect to the other components of the composition and thermally stable at its eventual baking temperature which fuses the fluoropolymer and binder of the primer. The filler film hardener is water insoluble so that it is typically uniformly dispersible but not dissolved in the aqueous dispersion form of the composition of the invention. Typically, the filler film hardener of this invention preferably comprises ceramic particles having an average particle size of at least 10 micrometers, preferably 14 to 60 micrometers, and more preferably at least 20-25 micrometers.

Further, the ceramic particles of the inorganic film hardener preferably have a Knoop hardness of at least 1200 and, more preferably, of at least 1500. Knoop hardness is a scale for describing the resistance of a material to indentation or scratching. Values for the hardness of minerals and ceramics are listed in the Handbook of Chemistry, $77^{th}$ Edition, 12-186, 187 based on reference material from Shackelford and Alexander, CRC Materials Science and Engineering Handbook, CRC Press, Boca Raton Fla., 1991. The film hardener component imparts durability to the non-stick fluoropolymer composition applied as a coating on a substrate by deflecting abrasive forces applied to the coating surface and by resisting penetration of sharp objects that have penetrated the fluoropolymer overcoat.

The ceramic particles of the inorganic film hardener preferably have an aspect ratio of not greater than 2.5, and more preferably not greater than 1.5. The aspect ratio is a means of quantifying a preferred particle shape. The aspect ratio is more fully described in U.S. Pat. No. 6,592,977. Particles with a high aspect ratio are flat unlike the preferred particles of this invention, which are preferably more spherical and more closely approach an ideal aspect ratio of 1. If particles in a coating on a substrate are small and have a high aspect ratio, they may be oriented parallel to a substrate and will not be able to deflect abrasive forces applied to a coated substrate. If particles are large and have a high aspect ratio, they may be oriented perpendicular to a substrate and protrude through a coating. An abrasive force may push against the tops of such particles distorting a coating and even pulling a particle from the coating, leaving a hole and causing the coating to be more rapidly abraded.

Preferably, the baked layer of primer has a dry film thickness (DFT) of 10-13 microns and 40-50 weight percent of silicon carbide and aluminum oxide in the primer and the baked layer of the intermediate layer has a dry film thickness of 18-23 microns for the intermediate layer containing 14-18 weight percent of silicon carbide and aluminum oxide in the intermediate layer.

Examples of inorganic filler film hardener include inorganic oxides, carbides, borides and nitrides having a Knoop hardness of at least 1200. Preferred are inorganic oxides, nitrides, borides and carbides of zirconium, tantalum, titanium, tungsten, boron, aluminum and beryllium. Particularly preferred are silicon carbide and aluminum oxide. Typical Knoop hardness values for preferred inorganic compositions are: zirconia (1200); aluminum nitride (1225); beryllia (1300); zirconium nitride (1510); zirconium boride (1560); titanium nitride (1770); tantalum carbide (1800); tungsten carbide (1880); alumina (2025); zirconium carbide (2150); titanium carbide (2470); silicon carbide (2500); aluminum boride (2500); titanium boride (2850).

Other Fillers

In addition to the particles of inorganic filler film hardener described above, the non-stick coating compositions of this invention may contain smaller particles of inorganic filler film hardener as well as other filler materials having a Knoop hardness value of less than 1200. Suitable additional fillers include small particles of aluminum oxide, calcined aluminum oxide, silicon carbide etc. as well as glass flake, glass bead, glass fiber, aluminum or zirconium silicate, mica, metal flake, metal fiber, fine ceramic powders, silicon dioxide, barium sulfate, talc, etc.

TEST METHODS

1. Dishwasher Adhesion Testing

Dishwasher testing: The adhesion and blistering of the coatings in Comparative Example 1 and Example 1 were subjected to testing in a Hobart industrial dishwasher using Goal 2 liquid detergent and Redy Rinse liquid made by Brewster Products.

The scratch adhesion test procedure is as follows: A coated glass substrate is crosshatched using a razor blade to leave a grid approximately 18 mm×18 mm containing 100 squares. An X was inscribed in the coating using the same razor blade. The coated glass is placed in the dishwasher and the dishwasher operated according to the manufactures instructions to give one cycle of testing. One cycle typically takes less than 3 min. After every 10 cycles, the glass is removed from the dishwasher, cooled and dried. Scotch® 8981 tape is placed over the crosshatch marks and the X and the tape is pulled to see if any crosshatch squares or parts of the X were removed. If one or more squares are removed it is considered a failure of the test. The cycles completed before failure is recorded. The test is completed and the coatings pass the test when 100 cycles are completed with no squares or parts of the prescribed X removed. Anything less than 100 cycles is also considered a failure of the test.

2. Accelerated Chicken Roasting Testing

The staining of the glass coating is tested using an accelerated chicken roasting test method. The stain resistant results are shown by Example 1 and Comparative Example 2 in Table 8. A Vulcan oven is preheated to 200 C. In the coated glass being tested, 50 g of butter is placed in the bake ware and melted in the oven for 2 minutes. A piece of chicken with salt and pepper is roasted in the coated glass bake ware for 1 hour at 200 C. After cooling the baked chicken and fat are removed from the bake ware. The non-stick property of the coating is measured by observing if remnants of the baked chicken stick to the coating. The glass is then placed in the industrial dishwasher and cleaned. The test is repeated for 30 cycles. The coating passes if 30 cycles are completed if the chicken can be easily removed from the cookware with no meat sticking to the coating. If meat sticks to the coating, than the test is considered a failure and cycles at failure are noted. Staining is considered a pass if the coating completes greater than 5 cycles with only slight discoloration of the coating. If staining is severe, the test is considered a failure and cycles to failure are noted. With coated glass, staining is mainly observed in the primer layer as seen through the glass bake ware.

EXAMPLES

Fluoropolymer

PTFE dispersion: DuPont TFE fluoropolymer resin dispersion grade 30, available from the DuPont Company, Wilmington, Del.

FEP dispersion: TFE/HFP fluoropolymer resin dispersion with a solids content of from 54.5-56.5 wt % and RDPS of from 150-210 nanometers, the resin having an HFP content of from 9.3-12.4 wt % and a melt flow rate of 11.8-21.3 measured at 372° C. by the method of ASTM D-1238 modified as described in U.S. Pat. No. 4,380,618.

PFA dispersion: DuPont PFA fluoropolymer resin dispersion grade 335, available from the DuPont Company, Wilmington, Del.

Polymer Binder

PAI is Torlon® AI-10 poly(amide-imide) (Amoco Chemicals Corp.), a solid resin (which can be reverted to polyamic salt) containing 6-8% of residual NMP.

Polyamic acid salt is generally available as polyamic acid having an inherent viscosity of at least 0.1 as measured as a 0.5 wt % solution in N,N-dimethylacetamide at 30° C. It is dissolved in a coalescing agent such as N-methylpyrrolidone, and a viscosity reducing agent, such as furfuryl alcohol and reacted with tertiary amine, preferably triethyl amine to form the salt which is soluble in water, as described in greater detail in U.S. Pat. No. 4,014,834 (Concannon).

Inorganic Filler Film Hardener

Silicon carbide by Elektroschmelzwerk Kempten GmbH (ESK), Munich Germany, distributed Micro Abrasives Corp., Westfield, Mass. The particle size of the silicon carbide ranged from 14.5 to 60.9 micrometers with average particle size being 20.8-22.8 micrometers. The particle size was measured using a Coulter Multisizer II according to information provided by the supplier. The Coulter Multisizer II is made by Beckman Coulter Incorporated, Fullerton, Calif.

Aluminum oxide supplied by Aluminum Corporation of America (ALCOA), Pittsburgh, Pa. The average particle size is measured to be 0.3 to 0.5 micrometers.

Colloidal Silica

Ludox AM polysilicate was obtained from W. R. Grace, Columbia, Md.

Silicone Resin:

Alkylphenyl polysiloxane resins are sold by Wacker Chemical Corporation under the tradename Silres®. Silres® REN-50 is one polysiloxane that can be used in the base coat.

Two tests were run to observe durability, adhesion and stain resistance. These are described in detail under the heading Test Methods. For purposes of these experimental tests, the four-coat system used comprises a base coat (Table 1), a primer (Table 2), an intermediate coat (Table 3) and a topcoat (Table 4) as described compositionally in the Tables referenced respectively. Tables 5 and 6 provide alternative primers. The three-coat system used for comparison did not have a base coat. The three-coat and four-coat system are described in further detail below under the Examples section. The coatings are applied to an 8"×8" square of Marinex® glass bake ware obtained from Saint Gobain, San Paulo, Brazil. Scotch® 8981 tape from the 3M Company, Minneapolis, Minn. is used for the adhesion scratch tests.

TABLE 1

Base Coat Formulation

| Ingredients | Weight Percent |
|---|---|
| Water | 13.17 |
| PTFE (solids in aqueous dispersion) | 43.3 |
| Triethanolamine | 0.42 |
| Diethylene glycol monobutyl ether | 1.92 |
| Alkylphenyl Polysiloxane Resin | 1.73 |
| Acrylic Polymer | 2.36 |
| Ludox AM Polysilicate | 29.9 |
| Sodium Naphthalenesulfonic Acid | 0.13 |
| Alkylphenolethoxy Surfactant | 3.04 |
| Titanium Dioxide | 2.68 |
| Carbon Black | 1.35 |
| | 100.0 |

TABLE 2

Primer Formulation

| Ingredients | Weight Percent |
|---|---|
| PAI | 5.16 |
| Water | 55.22 |
| PTFE (solids in aqueous dispersion) | 7.00 |
| FEP (solids in aqueous dispersion) | 5.18 |
| Furfuryl Alcohol | 3.58 |
| Diethylethanolamine | 0.66 |
| Triethylamine | 1.31 |
| Ethoxylated acetylenic diols | 0.24 |
| N-Methylpyrrolidone | 2.58 |
| Hydropropyl celluose | 0.02 |
| Ludox AM Polysilicate | 3.15 |
| Sodium Naphthalenesulfonic Acid | 0.19 |
| Alkylphenolethoxy Surfactant | 0.16 |
| Ultramarine blue pigment | 1.76 |
| Silicon carbide | 5.33 |
| Aluminum oxide | 8.15 |
| Carbon black | 0.31 |
| | 100.0 |

TABLE 3

Intermediate Coat Formulation

| Ingredients | Weight Percent |
|---|---|
| Water | 11.88 |
| PTFE (solids in aqueous dispersion) | 47.32 |
| PFA (solids in aqueous dispersion) | 8.35 |
| Acrylic polymer | 12.83 |
| Butylcarbitol | 2.04 |
| Triethanolamine | 3.91 |
| Oleic Acid | 1.03 |
| Hydrocarbon Solvent | 2.49 |
| Hydropropyl celluose | 0.02 |
| White Mica Pearl Flake | 0.84 |
| Sodium Naphthalenesulfonic Acid | 0.22 |
| Alkylphenolethoxy Surfactant | 0.69 |
| Ultramarine blue pigment | 0.28 |
| Cerium Octoate | 0.49 |
| Aluminum oxide | 6.56 |
| Carbon black | 1.05 |
| | 100.0 |

TABLE 4

Topcoat Formulation

| Ingredients | Weight Percent |
|---|---|
| Water | 4.64 |
| PTFE (solids in aqueous dispersion) | 66.13 |
| PFA (solids in aqueous dispersion) | 3.48 |
| Acrylic polymer | 12.93 |
| Butylcarbitol | 2.42 |
| Triethanolamine | 4.59 |
| Oleic Acid | 1.22 |
| Hydrocarbon Solvent | 2.96 |
| White Mica Pearl Flake | 0.43 |
| Alkylphenolethoxy Surfactant | 0.62 |
| Cerium Octoate | 0.58 |
| | 100.0 |

TABLE 5

Primer Composition A (alternative)

| Ingredients | Weight Percent |
|---|---|
| PAI | 3.64 |
| Water | 51.79 |
| PTFE (solids in aqueous dispersion) | 4.93 |
| FEP (solids in aqueous dispersion) | 3.65 |
| Furfuryl Alcohol | 2.52 |
| Diethylethanolamine | 0.46 |
| Triethylamine | 0.93 |
| Ethoxylated acetylenic diols | 0.18 |
| N-Methylpyrrolidone | 1.82 |
| Hydropropyl celluose | 0.02 |
| Ludox AM Polysilicate | 2.230 |
| Sodium Naphthalenesulfonic Acid | 0.28 |
| Alkylphenolethoxy Surfactant | 0.07 |
| Titanium Dioxide | 17.97 |
| Silicon carbide | 3.76 |
| Aluminum oxide | 5.75 |
| | 100.0 |

TABLE 6

Primer Composition B (alternative)

| Ingredients | Weight Percent |
|---|---|
| PAI | 3.9 |
| Water | 62.13 |
| PTFE (solids in aqueous dispersion) | 5.28 |
| FEP (solids in aqueous dispersion) | 3.92 |
| Furfuryl Alcohol | 2.7 |
| Diethylethanolamine | 0.5 |
| Triethylamine | 0.99 |
| Ethoxylated acetylenic diols | 0.18 |
| N-Methylpyrrolidone | 1.95 |
| Hydropropyl celluose | 0.02 |
| Ludox AM Polysilicate | 2.39 |
| Sodium Naphthalenesulfonic Acid | 0.12 |
| Alkylphenolethoxy Surfactant | 0.15 |
| Perylene Red pigment | 5.58 |
| Silicon carbide | 4.03 |
| Aluminum oxide | 6.16 |
| | 100.0 |

Comparative Example 1

Preparation of Three-Coat System without Base Coat

The surface of borosilicate glass bake ware was mechanically roughened using a grit blast method using 80 mesh grit at 30 psi, considered light grit blasting. The resulting glass has a roughness average measurement of 3-4 microns. The primer (Table 2), primer composition A (Table 5) or primer composition B (Table 6), is sprayed onto the roughened substrate and dried at 150° F. (66° C.) for 5 minutes. The dry film thickness of the primer coat is between 10-13 microns. The intermediate coat (Table 3) is then sprayed over the dried primer. The intermediate layer dry film thickness is between 18-23 microns. The topcoat (Table 4) is applied (sprayed) wet on wet to the intermediate coat (Table 3). The dry film thickness of the topcoat is between 8-10 microns. The coating is cured by baking at a temperature of 8000° F. (427° C.) for 5 minutes.

Example 1

Preparation of Four-Coat System

The preparation of the four-coat system was identical to the three-coat system except the base coat of Table 1 was sprayed on the roughened glass to produce a dry film thickness (DFT) of 0.3 microns. The primer (Table 2) is applied wet on wet to the base coat, and all other coatings were applied in an identical manner as Example 1. The dry film thickness of the primer layer is between 10-13 microns, the intermediate layer is between 18-23 microns and the topcoat is between 8-10 microns.

Comparative Example 2

Preparation of Three-Coat System without Primer

The preparation of a three-coat system where the primer layer is left out is done in a similar manner to Example 1 except the intermediate coat (Table 3) is sprayed directly onto the base coat (Table 2). All other coatings are applied in an identical manner as Example 1.

Table 7 shows that applying the base coat (Table 1) improves the adhesion of the coating onto the glass substrate and improves the dishwasher performance that allows the coated glassware to meet the pass goal of 100 cycles in accordance with the Dishwasher Adhesion Test.

TABLE 7

Dishwasher Adhesion Test

| Primer | System | Cycles | Comment |
| --- | --- | --- | --- |
| Table 5 | Comparative Example 1 | 20 | Fail |
| Table 6 | Comparative Example 1 | 20 | Fail |
| Table 6 | Comparative Example 1 | 30 | Fail |
| Table 2 | Comparative Example 1 | 30 | Fail |
| Table 5 | Comparative Example 1 | 40 | Fail |
| Table 2 | Comparative Example 1 | 40 | Fail |
| Table 2 | Comparative Example 1 | 50 | Fail |
| Table 2 | Example 1 | 100 | Pass |
| Table 2 | Example 1 | 100 | Pass |
| Table 2 | Example 1 | 100 | Pass |
| Table 2 | Example 1 | 100 | Pass |

Table 8 shows that the four-coat composition of Example 1 is superior to the three-coat composition of Comparative Example 2 (primer layer left out), and that the primer layer acts as a stain barrier to the invention.

TABLE 8

Accelerated Chicken Roasting Test

| Coating System | Cycles | Description |
| --- | --- | --- |
| Example 1 | greater than 5* | Pass |
| Example 1 | greater than 5* | Pass |
| Comparative Example 2 | 5 | Stopped, severe exterior staining |

*The cookware of Example 1 showed markedly less staining at 30 cycles then the cookware of Comparative Example 2 after only 5 cycles.

It is therefore, apparent that there has been provided in accordance with the present invention, a stain resistant non-stick coated article that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

It is claimed:
1. A coated article comprising:
   a) a glass substrate having a surface, and
   b) a stain resistant, non-stick coating adhered to the surface of said substrate, wherein said non-stick coating comprises:
      i) a base coat comprising fluoropolymer and colloidal silica, and
      ii) an overcoat comprising a primer layer, one or more intermediate layers and a topcoat, and wherein said overcoat comprises one or more polymer layers containing ceramic particles having an aspect ratio of not greater than 2.5; and
      wherein the amount of colloidal silica present in the base coat is from 20% to 35% by weight of the total solids.
2. The coated article of claim 1, wherein said coated article is cookware.
3. The coated article of claim 1, wherein said ceramic particles comprise a Knoop hardness of greater than 1200.
4. The coated article of claim 1, wherein said ceramic particles comprise an average particle size of greater than 10 micrometers.
5. The coated article of claim 1, wherein said ceramic particles comprises silicon carbide.
6. The coated article of claim 1, wherein said base coat has a dry film thickness of up to 8 microns.
7. The coated article of claim 1, wherein said glass substrate is borosilicate glass.
8. The coated article of claim 1, wherein said glass substrate is roughened prior to applying of the base coat.
9. The coated article of claim 8, wherein said glass substrate has an average roughness greater than 2 microns.
10. The coated article of claim 9, wherein said glass substrate has been roughened by grit blasting.
11. The coated article of claim 1, wherein said overcoat comprises at least one polymer layer comprising fluoropolymer.
12. The coated article of claim 1, wherein said primer comprises fluoropolymer.
13. The coated article of claim 1, wherein said one or more intermediate layers comprises fluoropolymer.
14. The coated article of claim 1, wherein said overcoat further comprises polymer binder.
15. The coated article of claim 12, wherein said primer further comprises polymer binder.

16. The coated article of claim 13, wherein one or more of said intermediate layers further comprises polymer binder.

17. The coated article of claim 14, wherein said coated article has a stain resistance sufficient to pass the Accelerated Roasted Chicken Test.

18. The coated article of claim 1, wherein said coated article passes 100 cycles of the Dishwasher Adhesion Test.

19. The coated article of claim 1, wherein said primer comprises silicon carbide and polyamideimide.

20. The coated article of claim 15, wherein said primer further comprises silicon carbide.

21. The coated article of claim 1, wherein the primer layer or one or more intermediate layers contains ceramic particles.

22. The coated article of claim 1, wherein the primer layer and one or more intermediate layers contains ceramic particles.

23. The coated article of claim 1, wherein said base coat further comprises silicone resin.

24. The coated article of claim 1, wherein said base coat further comprises silicone resin in an amount up to 3 weight percent in the dry base coat.

* * * * *